United States Patent
Miao et al.

(10) Patent No.: US 9,071,739 B2
(45) Date of Patent: *Jun. 30, 2015

(54) SINGLE PIXEL CAMERA (71) Applicant: Google Inc., Mountain View, CA (US)

(72) Inventors: Xiaoyu Miao, Sunnyvale, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,917

(22) Filed: Oct. 27, 2014

(65) Prior Publication Data
US 2015/0042834 A1 Feb. 12, 2015

Related U.S. Application Data (63) Continuation of application No. 13/839,876, filed on Mar. 15, 2013.

(60) Provisional application No. 61/695,007, filed on Aug. 30, 2012.

(51) Int. Cl.
H04N 5/225 (2006.01)
H04N 5/232 (2006.01)
H04N 5/374 (2011.01)
H04N 5/378 (2011.01)

(52) U.S. Cl.
CPC ........... *H04N 5/2251* (2013.01); *H04N 5/2257* (2013.01); *H04N 5/23212* (2013.01); *H04N 5/23229* (2013.01); *H04N 5/374* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 8,148,874 B2 | 4/2012 | Xie et al. |
| 8,189,089 B1 | 5/2012 | Georgiev et al. |
| 8,760,542 B2 | 6/2014 | Bridge et al. |
| 2006/0239336 A1 | 10/2006 | Baraniuk et al. |
| 2011/0109773 A1 | 5/2011 | Dekel |
| 2012/0188433 A1 | 7/2012 | Miyawaki |
| 2012/0300097 A1 | 11/2012 | Ng et al. |
| 2012/0314099 A1 | 12/2012 | Kelly et al. |
| 2014/0063314 A1 | 3/2014 | Sankaranarayanan et al. |
| 2014/0176753 A1 | 6/2014 | Hillis et al. |

OTHER PUBLICATIONS

Wakin, M. B. et al., "An Architecture for Compressive Imaging," Department of Electrical and Computer Engineering, Rice University, 2006, 4 pages.

(Continued)

Primary Examiner — Jason Flohre
(74) Attorney, Agent, or Firm — Blakely Sokoloff Taylor & Zafman LLP (57) ABSTRACT

A camera system includes a single pixel photo-sensor disposed in or on a substrate to acquire image data. A micro-lens is adjustably positioned above the single pixel photo-sensor to focus external scene light onto the single pixel photo-sensor. An actuator is coupled to the micro-lens to adjust a position of the micro-lens relative to the single pixel photo-sensor to reposition the micro-lens to focus the external scene light incident from different angles onto the single pixel photo-sensor. Readout circuitry is coupled to readout the image data associated with each of the different angles from the single pixel photo-sensor.

22 Claims, 5 Drawing Sheets (56) References Cited

OTHER PUBLICATIONS

Takhar, D. et al., "A New Compressive Imaging Camera Architecture using Optical-Domain Compression," Department of Electrical and Computer Engineering Rice University, SPIE, 2006, 10 pages.

Wakin, M. B. et al., "Compressive Imaging for Video Representation and Coding," Dept. of Electrical and Computer Engineering, Rice University, Houston, TX, USA, 2006, 6 pages.

Duarte, M.F. et al., "Single-Pixel Imaging via Compressive Sampling," IEEE Signal Processing Magazine, Mar. 2008, pp. 83-91.

Sankaranarayanan, A. C. et al., "Compressive Acquisition of Dynamic Scenes," Computer Vision—ECCV 2010, Lecture Notes in Computer Science vol. 6311, 2010, pp. 129-142.

Rice University DSP, "Single Pixel Camera," download from internet on Aug. 28, 2012; <http://dsp.rice.edu/research/compressive-sensing/single-pixel-camera> 1 page.

Sankaranarayanan, A. C. et al., "Compressive Acquisition of Dynamical Scenes," Department of Electrical and Computer Engineering, Rice University, 2012, 21 pages.

U.S. Appl. No. 13/839,876, filed Mar. 15, 2013, U.S. Notice of Allowance mailed Sep. 17, 2014, 35 pages.

SINGLE PIXEL CAMERA

CROSS-REFERENCE TO RELATED APPLICATION

The present patent application is a continuation of U.S. application Ser. No. 13/839,876, filed on Mar. 15, 2013, which claims the benefit of U.S. Provisional Application No. 61/695,007 filed on Aug. 30, 2012, the contents of which are incorporated herein by reference.

TECHNICAL FIELD

This disclosure relates generally to camera modules, and in particular but not exclusively, relates to integrated image sensors.

BACKGROUND INFORMATION

As the popularity of portable computing spreads, the demand for compact devices, such as smart phones, head mounted display ("HMDs"), tablets, laptops, etc., increases. To meet this demand, it is important to continue to shrink the form factor of internal components of these portable computing devices. One such internal device is a camera module.

Convention camera modules consist of a lens system and image sensor having a finite number of pixels. The resolution of the image captured by the camera module is determined by the pixel count of the particular image sensor. For example, a 5 mega-pixel image sensor with 1.75-um pixels has an active image area (pixel array) of about 4.6 mm×3.4 mm, while the whole image sensor die is approximately 5.75 mm×5.75 mm. This requires a lens system having a diagonal size of about 5.4 mm (often determined by the size of the last lens element in the lens system) so as to cover the whole image field on the image sensor. With the thickness of the lens barrel and camera holder, the horizontal dimension of the camera module extends to approximately 7.5 mm. Furthermore, to accommodate the finite resolution of the image sensor, the lens system often needs to include several lens elements stacked on top of each other to correct for optical aberrations to achieve a reasonable optical resolution across the whole image field. This lens stacking contributes significantly to the vertical height of the camera module.

As can be seen from the above discussion, the overall camera module size in all three dimensions is substantially determined in part by the size of the image sensor die. Therefore, one way to miniaturize a camera module is through reducing the size of the image sensor die. Conventionally, this size reduction has been achieved by shrinking the size of the individual pixels in the pixel array while maintaining or increasing the pixel count of the overall image sensor. However, there are a number of disadvantages to this miniaturization approach.

First, smaller pixel sizes impose significant challenges in the design and manufacturing of the camera lens system. As pixel sizes decrease, there must be a corresponding increase in the optical resolution of the lens system to maintain the image quality (e.g., sharpness). Second, smaller pixel sizes decrease the image sensor sensitivity and often sacrifice low-light performance for size and resolution. Third, there is a practical limit in the physical size to which a pixel can be shrunk. Pixels are already approaching this threshold, despite continued demand for increasingly smaller camera modules.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method of operation for a single pixel camera module are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
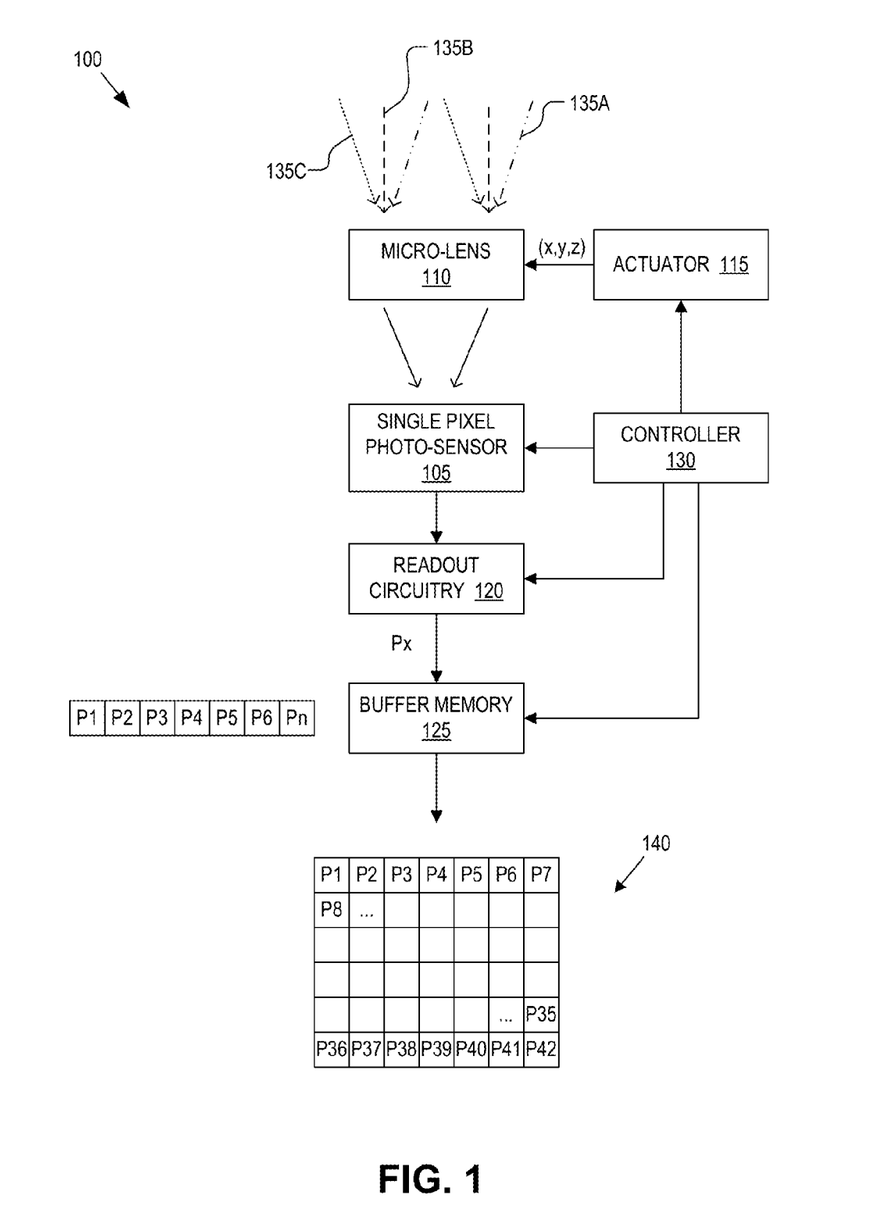
FIG. 1 is a functional block diagram illustrating components of a single pixel camera system, in accordance with an embodiment of the disclosure.

FIG. 1 is a functional block diagram illustrating components of a single pixel camera system 100, in accordance with an embodiment of the disclosure. The illustrated embodiment of single pixel camera system 100 includes a single pixel photo-sensor 105, a micro-lens 110, an actuator 115, readout circuitry 120, buffer memory 125, and a controller 130.

Single pixel photo-sensor 105 may be implemented as a complementary-metal-oxide-semiconductor ("CMOS") photo-diode (e.g., a P-I-N photo-diode, an avalanche photo-diode, or otherwise), a charge coupled device ("CCD"), or other photo-sensitive devices capable of capturing image data. In order to provide good low light sensitivity and large full well capacity and extended dynamic range, single pixel photo-sensor 105 may be implemented with a relatively large photo-sensitive area. For example, in the case of a photo-diode, single pixel photo-sensor 105 may be on the order of 10 µm to 100 µm. Of course, other sizes may be implemented as well.

Various different angles of incidence 135A, 135B, 135C of external scene light are sequentially brought to a focus on single pixel photo-sensor 105 by micro-lens 110. Micro-lens 110 may be implemented using refractive, diffractive, or hybrid lens types. Micro-lens 110 may be designed to have a depth of field ("DOF") that extends out to infinity. In this case, micro-lens 110 is configured to focus substantially collimated light onto single pixel photo-sensor 105. In one embodiment, micro-lens 110 is implemented as a clear or pigmented polymer material using photolithography and reflow techniques. In another embodiment, micro-lens 110 is implemented in plastic using injection molding techniques. In yet another embodiment, micro-lens 110 is a liquid lens. Of course, other lens technologies, materials, and fabrication techniques may be used.

Actuator 115 is coupled to micro-lens 110 to adjust its position to focus external scene light incident from different angles onto single pixel photo-sensor 105. In one embodiment, actuator 115 is a two-dimensional ("2D") actuator capable of translating micro-lens 110 along two independent axes (e.g., x and y). Offsetting micro-lens 110 from center alignment with single pixel photo-sensor 105 along a flat plane causes different angles of incidence to be selectively focused onto single pixel photo-sensor 105 at a given time. In one embodiment, actuator 115 is a three-dimensional ("3D") actuator capable of translating micro-lens 110 along three independent axes (e.g., x, y, z). A 3D actuator having a z-component adjustability to change the separation distance between micro-lens 110 and single pixel photo-sensor 105 could provide a variable DOF. In other embodiments, actuator 115 may constrain the movement of micro-lens 110 along an arc-like path that tilts micro-lens 110 with x and y displacements from center. For example, when micro-lens 110 is moved left to focus external scene light with incident angle 135C onto single pixel photo-sensor 105, micro-lens 110 is also tilted towards this angle. Tilting micro-lens 110 such that its central axis faces towards the direction of incident external scene light may increase the quantum efficiency of the system, since a greater portion of incident light can be captured by single pixel photo-sensor 105. Actuator 115 may be implemented using a variety of different technologies including micro-electro-mechanical systems ("MEMS"), electrical comb drivers, piezoelectric crystals, thermally expanding materials, shape memory alloys, electro-static capacitive actuators, magnetic actuators, etc.

Readout circuitry 120 may include a number of sub-components including a signal amplifier, correlated double sampling circuitry, and an analog-to-digital converter ("DAC"). The signal amplifier may be a conventional or differential amplifier for amplifying the analog output signal from single pixel photo-sensor 105. The correlated double sampling circuitry may be used to achieve a dark signal offset in the image data. The DAC converts the analog image signal to digital image data (pixel data), which is output from readout circuitry sequentially one pixel Px at a time.

Buffer memory 125 may include volatile memory (e.g., SRAM, DRAM, etc.), non-volatile memory (e.g., NAND or flash memory, etc.), or hardware registers for temporarily buffering the sequential stream of image data output from readout circuitry 120. In one embodiment, buffer memory 125 is large enough to store at least one entire image frame 140 of pixel data along with metadata indicating how to order the pixel data into a 2D image frame. In one embodiment, the metadata may be actual data stored along with each unit of pixel data. Since the pixel data is sequentially output from readout circuitry 120 in a consistent and repeated pattern, in one embodiment, the metadata is stored in the order in which the pixel data is stored within buffer memory 125. As such, in this embodiment, pixel data may simply be stored in a linear buffer. If single pixel camera system 100 is capable of selectively acquiring different image resolutions, then the resolution setting may also be stored in buffer memory 125 so that the pixel data can be appropriately reassembled when output from buffer memory 125.

In the illustrated embodiment, controller 130 is coupled to each of actuator 115, single pixel photo-sensor 105, readout circuitry 120, and buffer memory 125 to coordinate their operation. Controller 130 may be implemented by software/firmware instructions executed on a microprocessor, implemented entirely in hardware logic (e.g., ASIC, FPGA, etc.), or a combination of both. Controller 130 outputs control signals to actuator 115 to select a given position for micro-lens 110. The control signals output from controller 130 to single pixel photo-sensor 105 may include a reset signal to reset the photo-sensor between image acquisition windows, a shutter signal to commence image acquisition, and a transfer signal to transfer the image charge to an internal storage node for biasing an output transistor. In one embodiment, controller 130 is coupled to readout circuitry 120 to indicate when the analog image signal output from single pixel photo-sensor 105 is valid and to acquire a black level signal from single pixel photo-sensor 105 for correlated double sampling. In the illustrated embodiment, controller 130 is further coupled to buffer memory 125 to control output of the pixel data off-chip as an image file or image frame 140.

In one embodiment, the functional components of single pixel camera system 100 illustrated in FIG. 1 may be integrated onto a single semiconductor die. Wafer level fabrication techniques may be used to fabricate many instances of system 100 on a wafer, which are then diced and packaged. For example, micro-lens 110 may be fabricated using UV replicating technology, while the circuit components of single pixel photo-sensor 105, controller 130, readout circuitry 120, and buffer memory 125 may be implemented using conventional CMOS technologies. In the case of MEMS technologies, actuator 115 may also be fabricated on the same die using compatible semiconductor fabrication techniques.

Figure 2:
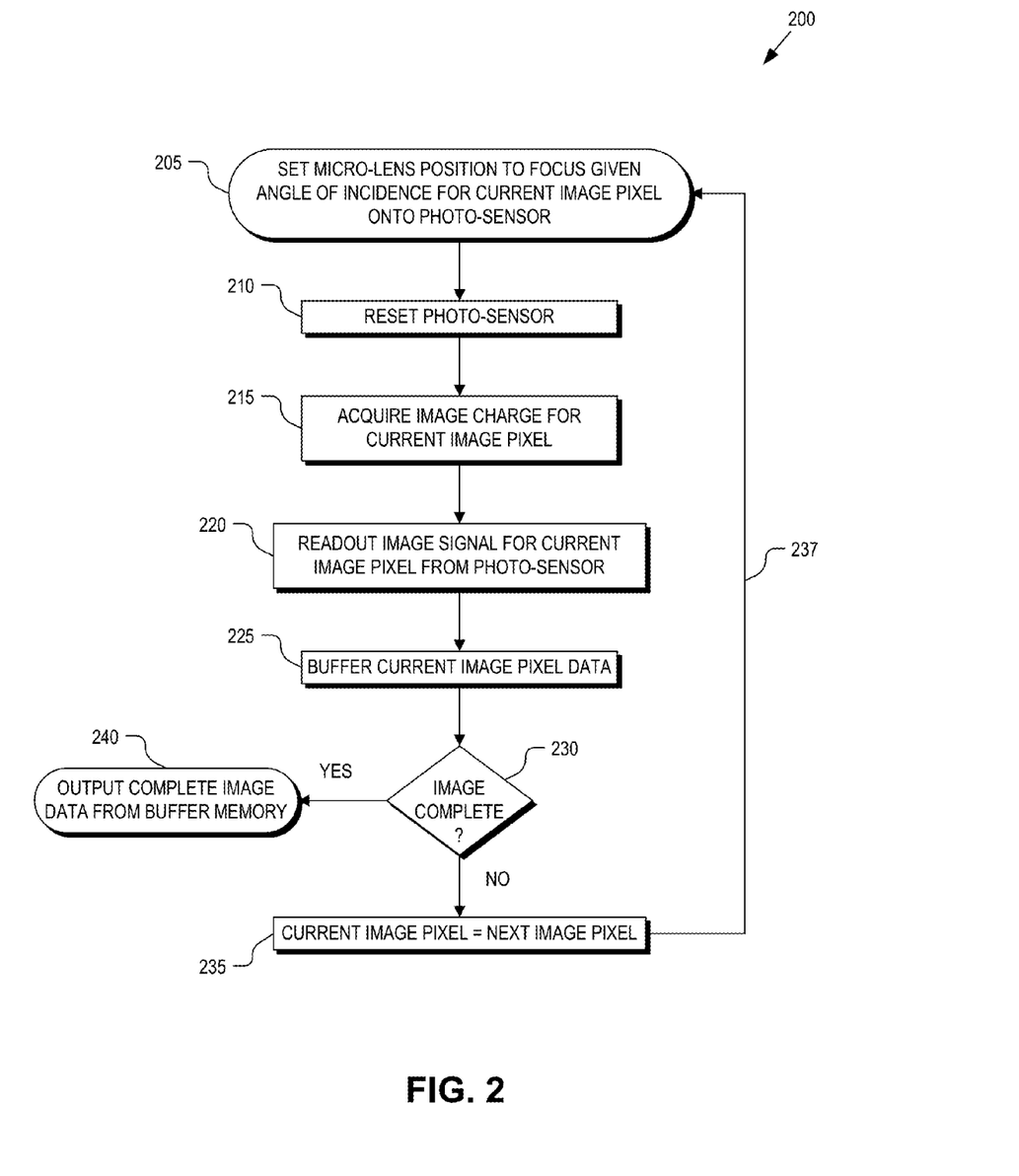
FIG. 2 is a flow chart illustrating operation of a single pixel camera system, in accordance with an embodiment of the disclosure.

FIG. 2 is a flow chart illustrating a process 200 for operation of single pixel camera system 100, in accordance with an embodiment of the disclosure. The order in which some or all of the process blocks appear in process 200 should not be deemed limiting. Rather, one of ordinary skill in the art having the benefit of the present disclosure will understand that some of the process blocks may be executed in a variety of orders not illustrated, or even in parallel.

In a process block 205, actuator 115 is configured by controller 130 to adjust the position of micro-lens 110 to select a given angle of incidence of external scene light. In a process block 210, single pixel photo-sensor 105 is reset to erase any image charge remaining from the previous image acquisition cycle. Resetting the photo-sensor may include coupling the photo-sensor to a default voltage. Once reset, image acquisition (photo-generated charge integration) can commence to acquire the image charge for the current image pixel (process block 215). After the acquisition window is complete, an analog image signal is read into readout circuitry 120 (process block 220). In one embodiment, during readout, readout circuitry 120 amplifies the analog image signal, offsets the black level, and converts the analog image signal to digital image data (pixel data). In process block 225, the current pixel data is buffered into buffer memory 125. If the complete image frame has not yet been acquired (decision block 230), then the current image pixel is updated (process block 235) and process 200 returns to process block 205 where the position of micro-lens 110 is re-adjusted. In one embodiment, while micro-lens 110 is being repositioned to acquire the next image pixel, the charge on single pixel photo-sensor 105 is being reset in anticipation of acquiring the next image pixel data. Loop 237 continues until an entire/complete image frame is acquired (decision block 230). Once an entire image frame is buffered in buffer memory 125, the complete image can be assembled into an image file format and output off-chip (process block 240). Thus, actuator 115 and controller 130 sequentially readjust the position of micro-lens 110 to scan through each angle of incidence one pixel at a time to focus light from different spatial points in the external scene. In other words, in one embodiment, actuator 115 raster scans micro-lens 110 through each position of a single image frame. The raster scan may follow a variety of different sweeping patterns including scanning rows, scanning columns, diagonal scanning, left-to-right scanning, right-to-left scanning, left-to-right-to-left and repeat scanning, a clockwise or counterclockwise spiral scan, or otherwise. The term "raster scan" is used broadly herein to refer to a sweeping motion that traces out all image pixel locations in an image frame in any pattern. Depending upon the type of actuator, a per pixel scan frequency of 100 Hz to 0.1 GHz may be achievable, making video images realizable.

Figure 3A:
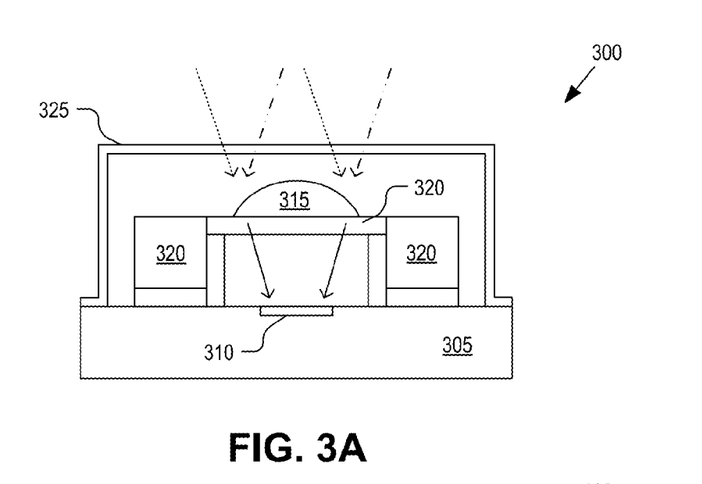
FIGS. 3A and 3B illustrate a single pixel camera module, in accordance with an embodiment of the disclosure.
Figure 3B:
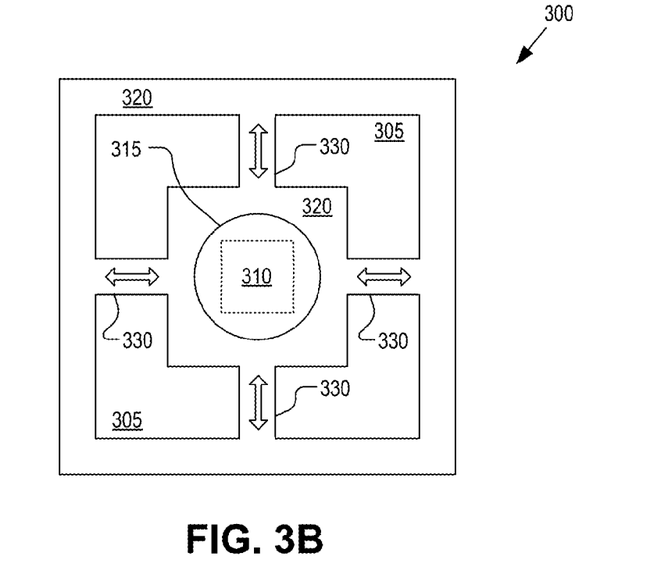

FIGS. 3A and 3B illustrate a single pixel camera module 300, in accordance with an embodiment of the disclosure. FIG. 3A is a cross-sectional view of single pixel camera module 300 while FIG. 3B is a plan view of the same. Single pixel camera module 300 is one possible implementation of single pixel camera system 100. The illustrated embodiment of single pixel camera module 300 includes a substrate 305 (e.g., semiconductor die), a photo-sensor 310, a micro-lens 315, an actuator 320, and a housing 325. The other control system elements including readout circuitry, buffer memory, and a controller are not illustrated in FIGS. 3A and 3B; however, these elements can be integrated into/onto substrate 305 using CMOS technologies.

Actuator 320 represents one possible 2D scanning actuator that is capable of adjusting a position of micro-lens 315 in a 2D x-y plane via contraction/expansion of connecting members 330 via electro-static forces. In the illustrated embodiment, micro-lens 315 is encapsulated (e.g., hermetically sealed) within a vacuum by a transparent housing 325. The vacuum reduces drag associated with quick motions through air and prevents dust or debris from obstructing or jamming actuator 320.

Figure 4:
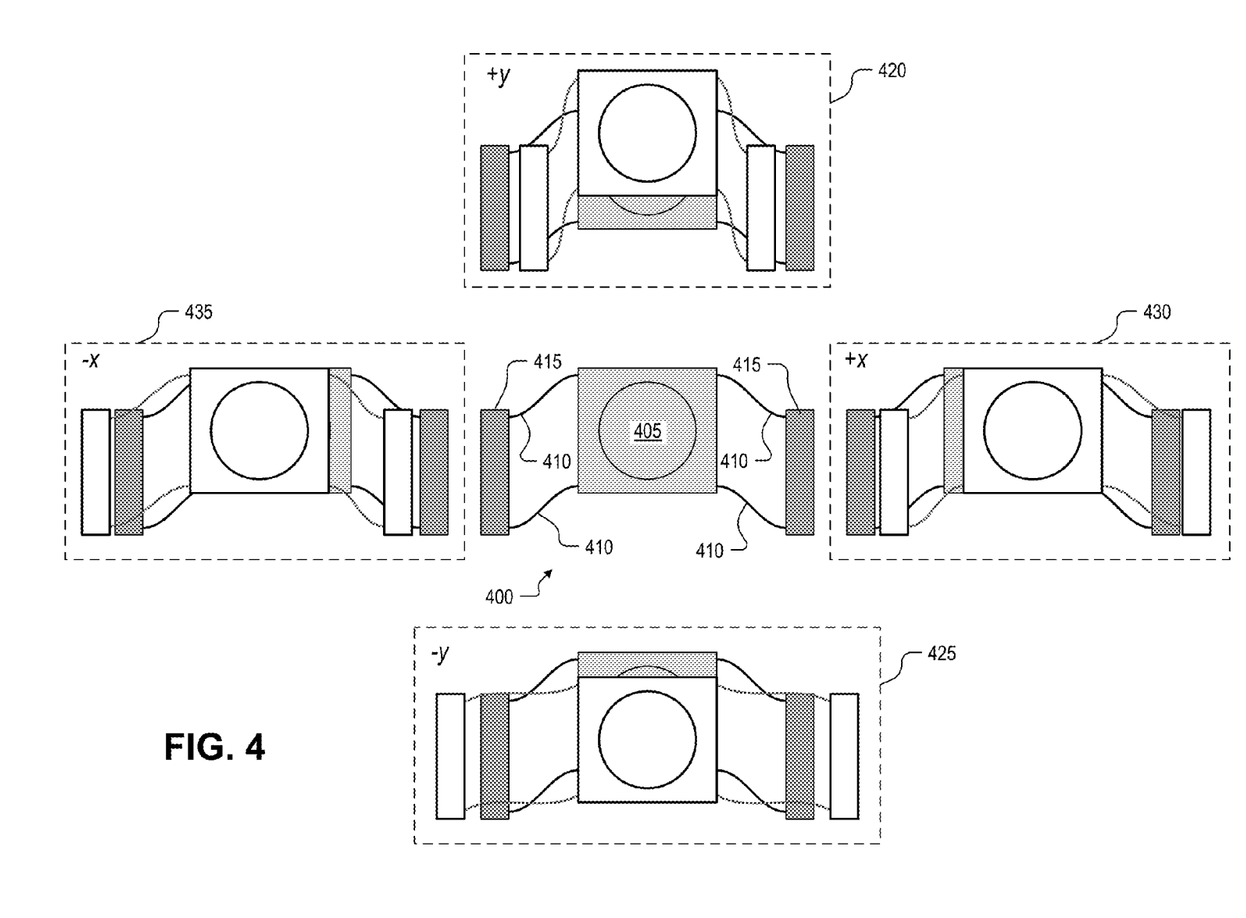
FIG. 4 illustrates operation of a two-dimensional scanning actuator, in accordance with an embodiment of the disclosure.

FIG. 4 illustrates a single pixel camera module 400, in accordance with an embodiment of the disclosure. Single pixel camera module 400 is another possible implementation of a 2D scanning actuator version of single pixel camera system 100. Only the micro-lens 405 and actuator components: flexible members 410 and adjustable anchors 415 are illustrated so as not to clutter the drawing; however, it should be appreciated that the remaining components of single pixel camera system 100 are also integrated into the system. During operation, adjustable anchors 415 are actuated to move left or right, which in turn compresses or stretches flexible members 410, thereby selectively moving micro-lens 405.

The center depiction illustrates single pixel camera module 400 at its default resting position. To move micro-lens 405 upwards along the +y direction, both left and right anchors 415 are moved inward (see depiction 420). To move micro-lens 405 downwards along the −y direction, both left and right anchors 415 are moved outward (see depiction 425). To move micro-lens 405 right along the +x direction, both left and right anchors 415 are moved to the right (see depiction 430). To move micro-lens 405 left along the −x direction, both left and right anchors 415 are moved to the left (see depiction 435).

Anchors 415 may be actuated using a variety of techniques including electro-static capacitive plates, piezoelectric crystals, or otherwise.

Figure 5:
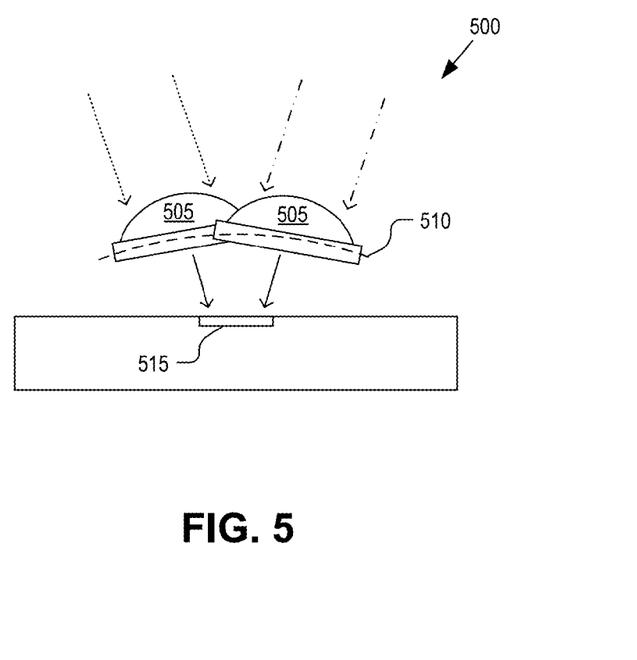
FIG. 5 illustrates operation of a scanning actuator that moves the micro-lens along an arc path to acquire external scene light incident at different angles, in accordance with an embodiment of the disclosure.

FIG. 5 illustrates operation of a scanning actuator 500 that moves a micro-lens 505 along an arc path 510 to acquire external scene light incident at different angles, in accordance with an embodiment of the disclosure. As discuss above, actuating micro-lens 505 in a manner that facilitates tilting micro-lens 505 towards the direction of the incident light can serve to increase quantum efficiency the image sensor by capturing and focusing more light onto single pixel photo-sensor 515. Arc path 510 may implemented using one or more tracks that guide micro-lens 505 and follow a curved path.

Figure 6:
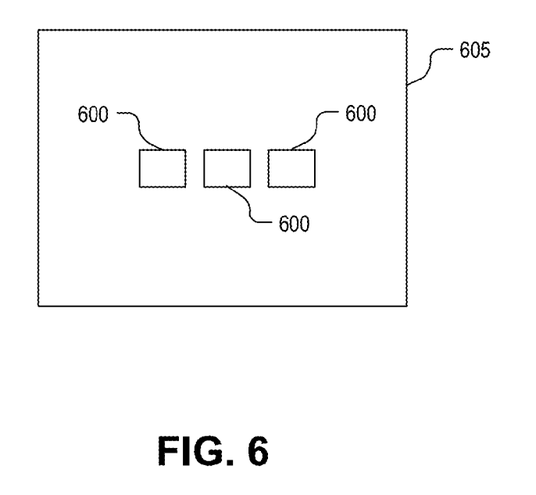
FIG. 6 illustrates how multiple single pixel camera modules can be integrated onto a common semiconductor die, in accordance with an embodiment of the disclosure.

FIG. 6 illustrates how multiple single pixel camera modules 600 can be integrated onto a single common semiconductor die 605, in accordance with an embodiment of the disclosure. In one embodiment, a color image sensor is achieved by including a different color filter (e.g., red, green, blue) with the micro-lens of each camera module 600. The scanned images acquired by each camera module 600 can then registered/aligned to each other and combined to generate a color image frame. In one embodiment, each camera module 600 can be assigned to scan out different spatial coordinates of an external scene. The different spatial coordinates correspond to different portions of a single composite image frame. After a calibration to align the constituent portions of the image frame, the image data from each camera module 600 could then be stitched together to generate a single complete image frame. This divide and conquer approach to scanning out a single image frame may be used to achieve high video frame rates. Although FIG. 6 illustrates three camera modules 600 arranged in a line, any number of camera modules 600 arranged in other patterns may be implemented.

In another embodiment, two camera modules may be positioned on the same substrate and have their actuators and/or controllers linked or slaved so that the respective micro-lens 110 of each camera module is repositioned in unison to acquire stereoscopic images. In this embodiment, the controllers would operate to synchronize the raster scanning of the two micro-lenses while each acquires its respective image frame that collectively provide depth perception or a 3D image.

The processes explained above are described in terms of software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera system, comprising:
   a single pixel photo-sensor disposed in or on a substrate to acquire image data;
   a micro-lens adjustably positioned above the single pixel photo-sensor to focus external scene light onto the single pixel photo-sensor;
   an actuator coupled to the micro-lens to adjust a position of the micro-lens relative to the single pixel photo-sensor to reposition the micro-lens to focus the external scene light incident from different angles onto the single pixel photo-sensor; and
   readout circuitry coupled to the single pixel photo-sensor to readout the image data associated with each of the different angles from the single pixel photo-sensor.

2. The camera system of claim 1, wherein the actuator comprises a two-dimensional ("2D") actuator capable of translating a position of the micro-lens along a plane in two dimensions to raster scan pixels of the single image frame.

3. The camera system of claim 2, wherein the micro-lens comprises a fixed depth of field lens.

4. The camera system of claim 1, wherein the actuator comprises a three-dimensional ("3D") actuator capable of translating a position of the micro-lens along a plane in two dimensions to raster scan pixels of the single image frame and adjusting a separation height of the micro-lens from the single pixel photo-sensor to provide a variable depth of field focus.

5. The camera system of claim 1, wherein the actuator includes an arc-shaped track that guides the micro-lens along an arc path when displaced from a reference position, wherein the arc path tilts a central axis of the micro-lens towards a direction of the external scene light as the micro-lens is displaced from the reference position.

6. The camera system of claim 1, further comprising:
   a memory buffer to buffer the single image frame acquired by the single pixel photo-sensor.

7. The camera system of claim 6, wherein the substrate comprises a complementary-metal-oxide-semiconductor ("CMOS") die and wherein the single pixel photo-sensor, the memory buffer, and the readout circuitry are integrated onto the substrate.

8. The camera system of claim 7, wherein the actuator and the micro-lens are also integrated onto the CMOS die.

9. The camera system of claim 1, further comprising:
   a clear housing attached to the substrate and hermetically sealing the micro-lens, the actuator, and the single pixel photo-sensor within a vacuum.

10. The camera system of claim 1, further comprising:
    three camera modules disposed on the substrate and each including an instance of the single pixel photo-sensor, the micro-lens, the actuator, and the readout circuitry, wherein each of the three camera modules includes a different color filter to acquire a different color of the external scene light.

11. The camera system of claim 1, further comprising:
    a plurality of camera modules disposed on the substrate and each including an instance of the single pixel photo-sensor, the micro-lens, the actuator, and the readout circuitry, wherein the instances of the actuators are controlled such that each camera module scans out different spatial coordinates of the external scene light.

12. The camera system of claim 1, wherein the actuator comprises:
    a pair of adjustable anchors disposed on either side of the micro-lens; and
    flexible members coupled between the adjustable anchors and the micro-lens, wherein the flexible members are compressed or stretched by the adjustable anchors to translate the micro-lens along a first axis when the adjustable anchors translate in opposite directions to each other along a second axis substantially orthogonal to the first axis.

13. The camera system of claim 1, wherein the actuator comprises one of a micro-electro-mechanical system, an electrical comb driver, a piezoelectric crystal, a thermally expanding material, a shape memory alloy, an electro-static capacitive actuator, or a magnetic actuator.

14. A method of operating a camera system, comprising:
    repositioning a micro-lens through multiple positions disposed over a single pixel photo-sensor via an actuator coupled to the micro-lens; and
    acquiring image signals of external scene light with the single pixel photo-sensor, wherein each of the image signals captures an image of the external scene light incident from a different angle selected via a corresponding position of the multiple positions, wherein the image signals acquired from the multiple positions represent an image frame.

15. The method of claim 14, wherein the repositioning comprises raster scanning the micro-lens disposed over the single pixel photo-sensor through the multiple positions.

16. The method of claim 15, further comprising:
    buffering metadata with the image signals indicative of a raster scan pattern to facilitate assembling the image signals of the image frame into an image file format.

17. The method of claim 16, wherein the metadata indicates a resolution of the 2D image.

18. The method of claim 15, further comprising:
    raster scanning a plurality of micro-lenses disposed over a corresponding plurality of single pixel photo-sensors disposed on a common substrate, wherein each of the micro-lenses scans a different set of spatial coordinates to capture a different portion of a single composite image frame; and
    combining the image frames that capture a different portion of the single composite image frame by each of the single pixel photo-sensors into the single composite image frame.

19. The method of claim 14, further comprising:
    resetting a charge acquired by the single pixel photo-sensor while the micro-lens is being moved between positions of the multiple positions.

20. The method of claim 14, wherein the single pixel photo-sensor, the micro-lens, and the actuator that moves the micro-lens are integrated onto a complementary-metal-oxide-semiconductor ("CMOS") die.

21. The method of claim 20, wherein the single pixel photo-sensor, the micro-lens, and the actuator are hermetically sealed in a vacuum by a clear housing that attaches to the CMOS die.

22. The method of claim 20, wherein the actuator comprises a micro-electro-mechanical system ("MEMS") device that includes a pair of adjustable anchors disposed on either side of the micro-lens and flexible members coupled between the adjustable anchors and the micro-lens, wherein repositioning the micro-lens includes: compressing or stretching the adjustable anchors to translate the micro-lens along a first axis when the adjustable anchors translate in opposite directions to each other along a second axis substantially orthogonal to the first axis.

* * * * *